March 24, 1925.

L. L. WHITNEY

Re. 16,029

FULCRUM AND METHOD OF MAKING SAME

Original Filed June 5, 1922

Witness:
P. Burkhardt.

Inventor:
Loren L. Whitney,
By Pickinson, Shurley, Byron & Knight
Attys.

Reissued Mar. 24, 1925. Re. 16,029

UNITED STATES PATENT OFFICE.

LOREN L. WHITNEY, OF HAMMOND, INDIANA, ASSIGNOR TO AMERICAN STEEL FOUNDRIES, OF CHICAGO, ILLINOIS, A CORPORATION OF NEW JERSEY.

FULCRUM AND METHOD OF MAKING SAME.

Original No. 1,521,410, dated December 30, 1924, Serial No. 565,998, filed June 5, 1922. Application for reissue filed February 9, 1925. Serial No. 7,999.

*To all whom it may concern:*

Be it known that I, LOREN L. WHITNEY, a citizen of the United States, residing at Hammond, in the county of Lake and State of Indiana, have invented certain new and useful Improvements in a Fulcrum and Method of Making Same, of which the following is a specification.

This invention relates to a brake beam fulcrum and a method of making same.

One object of the invention is to provide a simple, durable and efficient forged fulcrum requiring a minimum amount of metal and has its parts arranged and cooperating in a manner to meet the various requirements for successful use under service conditions.

Another object is to provide a simple and improved method of making such fulcrums.

These and other objects are accomplished by means of the arrangement disclosed on the accompanying sheet of drawings, in which—

The various novel features of the invention will be apparent from the following description and drawings, and will be particularly pointed out in the appended claims.

Figure 1:
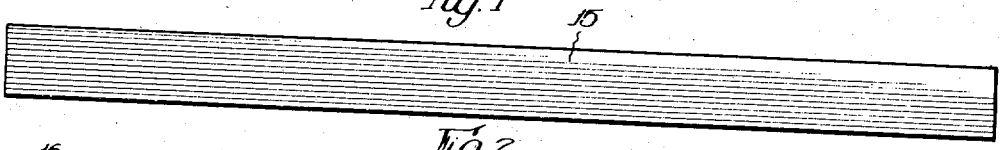
Figure 1 is a plan view of a blank from which the fulcrum is made.
Figure 2:
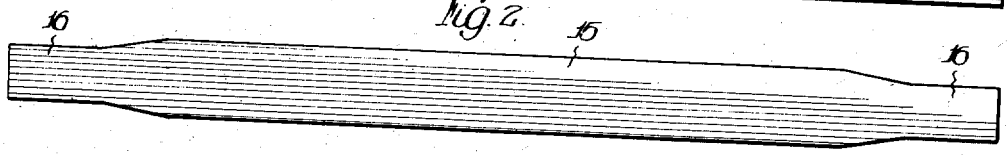
Figure 2 is a plan view of the same blank with the ends thereof sheared at an angle to the proper width so that the fulcrum will fit between the flanges of the associated compression member of a brake beam.
Figure 3:
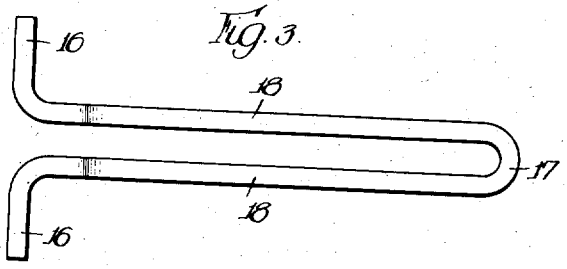
Figure 3 is a top plan view.
Figure 4:
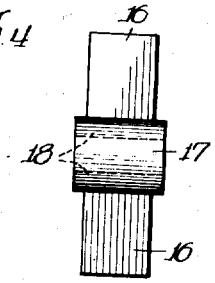
Figure 4 is an end view of the blank after it is bent intermediate its ends and its extremities bent outwardly to form feet which may be secured to the compression member of a brake beam.
Figure 5:
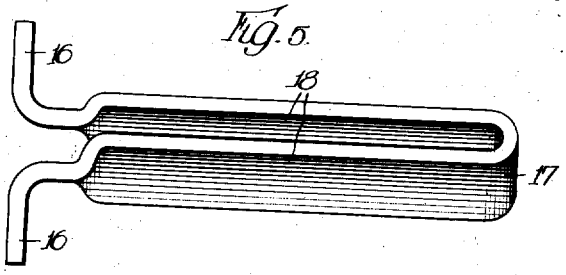
Figures 5 and 6 are top plan and end elevational views respectively, of the same fulcrum member after the main body part has been twisted at an angle with respect to the feet.
Figure 6:
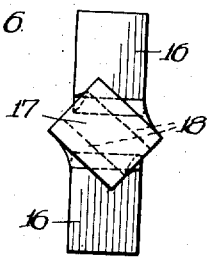
Figure 7:
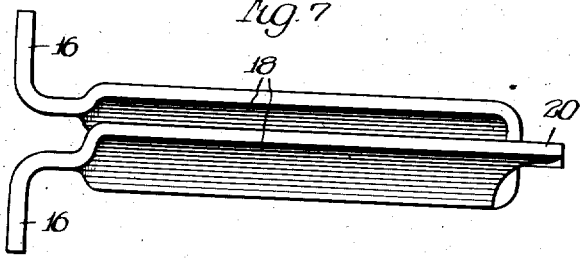
Figures 7 and 8 are top plan and end views respectively, of the fulcrum after the bent portion is cut and the cut portions bent upwardly to form tension rod guides.
Figure 8:
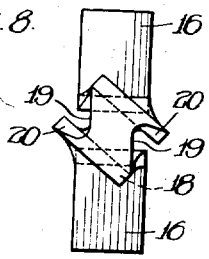
Figure 9:
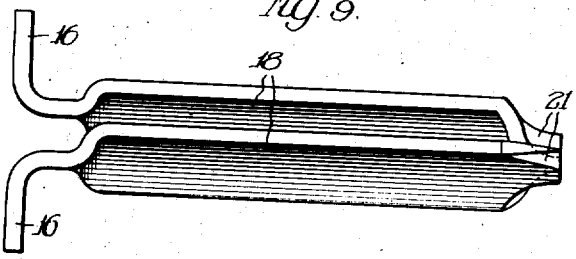
Figures 9 and 10 are top plan and end views respectively, of the completed fulcrum.
Figure 10:
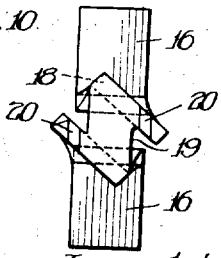

Referring to the figures of the drawings, it will be noted that a metal blank 15, such as a bar of steel, is provided. The ends of the blank are sheared to the proper width to form foot portions 16 to be received between the flanges of a brake beam compression member. Preferably, the blank is then heated and bent intermediate its ends to form a loop 17 with legs 18 between which a brake lever may be received. During this operation the feet 16 are bent outwardly at right angles to the legs 18 to provide attaching means to the compression member of a brake beam. The legs 18 are then turned or twisted at an angle with respect to the feet 16 to permit the use of a brake lever arranged at an angle from the vertical, which angle is usually about forty (40) degrees. The metal at 17 at the end of the loop is then sheared in lines intersecting the planes of the legs 18 or along parallel lines 19 which also run parallel to the length of the feet 16 and the sheared portions bent or struck up to form guides 20 for a brake beam tension member. The tension rod end of the fulcrum is then drawn to the proper contour to fit the radius of the tension rod at that point, the curvature being shown along the line 21 in Figure 9. The guides 20 are also shaped in this operation, the tops of said guides appearing diagonal in shape in Figure 10 and the tension rod seat or saddle extending in the same direction as the feet 16 in Figure 10.

By means of this method it is unnecessary to upset any of the metal, and the parts of the fulcrum may be quickly shaped in a simple and efficient manner, resulting in a brake beam fulcrum adapted to meet the various requirements under service conditions.

It is my intention to cover all modifications of the invention falling within the spirit and scope of the following claims.

I claim:

1. A method of making a forged fulcrum consisting first in providing a blank, then bending same intermediate its ends to form legs between which a brake lever may be received, and then cutting the blank at its bend and striking up the cut portions to form tension rod guides.

2. A method of making a forged fulcrum consisting first in providing a blank, then bending same intermediate its ends, and then striking up portions of the blank along cut lines at its bend to form tension rod guides.

3. A method of making a forged fulcrum consisting first in providing a blank, then bending same intermediate its ends to form legs between which a brake beam lever may be received, then twisting one part of the blank with respect to the other, then shearing the metal at the bent end in lines intersecting the planes of said legs, and then striking up said cut portions to form tension rod guides.

4. A method of making a forged fulcrum consisting first in providing a blank, then bending same intermediate its ends to form legs between which a brake beam lever may be received, then twisting one part of the blank with respect to the other, then shearing the metal at the bent end in lines intersecting the planes of said legs, then striking up said cut portions to form tension rod guides, and then drawing the bent end of the fulcrum to form a curved seat for the tension rod.

5. A forged fulcrum comprising a loop member being cut at the loop along lines intersecting the planes of the legs of the loop and to form tension rod guides.

6. A forged fulcrum comprising a loop member being cut and turned up at the loop to form tension member guides.

Signed at Hammond, Indiana, this 4th day of February, 1925.

LOREN L. WHITNEY.